United States Patent
Kuck et al.

[11] Patent Number: 6,131,416
[45] Date of Patent: Oct. 17, 2000

[54] BUBBLE PREVENTION IN COATING OF FILAMENTS

[75] Inventors: Valerie Jeanne Kuck, Upper Montclair; Peter Gerald Simpkins, Chatham, both of N.J.

[73] Assignee: Lucent Technologies Inc., Murray Hill, N.J.

[21] Appl. No.: 09/246,053

[22] Filed: Feb. 8, 1999

[51] Int. Cl.$^7$ .................................................. C03C 17/02
[52] U.S. Cl. ................................. 65/443; 65/447; 65/450; 65/453
[58] Field of Search .......................... 65/379, 381, 443, 65/447, 450, 453; 427/434.6, 434.7

[56] References Cited

U.S. PATENT DOCUMENTS

| | | | |
|---|---|---|---|
| 4,246,299 | 1/1981 | Ohls | 427/541 |
| 4,374,161 | 2/1983 | Geyling et al. | 427/160 |
| 4,480,898 | 11/1984 | Taylor | 350/96.3 |
| 4,533,570 | 8/1985 | Iyengar | 427/163 |
| 4,622,242 | 11/1986 | Mackay | 427/163 |
| 4,704,307 | 11/1987 | Jochem et al. | 427/117 |
| 5,820,674 | 10/1998 | Aidun | 118/410 |
| 5,974,837 | 11/1999 | Abbott, III et al. | 65/432 |

*Primary Examiner*—Sean E Vincent
*Attorney, Agent, or Firm*—Peter V. D. Wilde; Thomas, Kayden, Horstemeyer & Risley LLP

[57] ABSTRACT

A method for high velocity coating optical fibers includes passing a fiber with diameter l at velocity V through a coating container to which liquid coating material with viscosity $\mu$ is supplied under pressure p. Unwanted bubble formation in the coating is prevented by adjusting one or more of the parameters V, l, $\mu$, and p using the relationship:

$$S = pl/\mu V$$

where S is a constant characteristic of the coating container/die structure.

6 Claims, 1 Drawing Sheet

BUBBLE PREVENTION IN COATING OF FILAMENTS

FIELD OF THE INVENTION

This invention relates to coating filaments, e.g. optical fibers, with coatings, e.g. polymer coatings.

BACKGROUND OF THE INVENTION

Optical fiber production generally involves drawing a glass fiber from a glass preform, which usually is of silica glass, then applying a layer of coating material to the fiber. The coating is applied instantly after draw to prevent contamination or contact of any kind with the nascent fiber surface. The coating material is typically a UV curable polymer. Dual coated substrates, in particular optical fibers, are usually coated with a first layer of relatively soft polymer and a second layer of a higher modulus polymer for maintaining high strength and abrasion resistance. The coated fibers must be capable of withstanding, over their entire length, a maximum stress level to which the fiber will be exposed during installation and service. A single fiber failure can result in the loss of several hundred circuits.

Optical fibers are usually coated by a wet coating process which typically involves passing the newly drawn fiber through a reservoir of liquid prepolymer material and then curing the prepolymer by exposure to curing radiation, most commonly, ultra-violet light. In the dual coating process, coatings are applied in tandem or simultaneously (within the same applicator or die assembly). The tandem arrangement applies a first coating layer which is then cured, and then the second coating layer is applied and cured. In the simultaneous dual coating arrangement, both coats are applied after which they are cured.

During the coating process, when the fiber passes through the liquid prepolymer, the glass surface of the fiber pulls the meniscus of the liquid prepolymer into a cusp, which results in the entrainment of air bubbles in the coating. The bubble entrainment increases with draw rate. High speed drawing and coating is desirable for reducing cost of the fiber manufacturing operation, but draw speed must be tempered with preventing excess bubble formation in the coating. Bubbles give rise to a number of problems. Bubbles can cause losses in signal transmission by, for example, causing inhomogeneity of the modulus near the glass surface which in turn may cause mechanical distortion of the fiber. Bubbles can also weaken the mechanical strength of the coated fiber. Bubbles at or near the fiber surface interfere with inking and cause cosmetic concerns.

The fluid dynamics of bubble formation has been studied in detail. See e.g., S. F. Kistler, *Hydrodynamics of Wetting, Wettability*, ed. J. C. Berg, Marcel Dekker, New York, New York (1993). When the coating speed is less than the critical value at which air entrainment occurs, the contact line is generally normal to the motion of the substrate (e.g. the fiber). As the speed exceeds a critical value, the contact line appears to become serrated, or saw-tooth like, an observation that was first reported by T. D. Blake et al., *Nature* 282, pp.489–491 (1979). See also B. Bolton, et al., *Chem. Eng. Sci.* 35, pp. 597–601 (1980); M. T. Ghannam et al., *AIChE J.* 36, pp. 1283–1286. These authors have observed that bubble generation occurs at the leading cusps of the serrations, but the mechanism involved has not been investigated thoroughly.

In a recent study of free surface cusps, it was observed that powder on the surface of the coating fluid was swept into the interior of the fluid when the motion speed was sufficiently large. See J. -T. Jeong et al. *J. Fluid Mech.* 241, pp. 1–22 (1992). They did not observe bubble formation so that problem in a practical context was not addressed. Studies of two-dimensional cusps in a four roller apparatus (see G. I. Taylor, *Proc. R. Soc. London,* A146, pp. 501–523 (1934)) were reported by D. D. Joseph et al., *J. Fluid Mech.* 241, pp. 1–22 (1991). Other recent analytical work on cusped interface formation was reported by C. Pozrikidis, *J. Fluid Mech.* 357, pp. 29–57 (1998) and Y. D. Shiikhumurzaev, *J. Fluid Mech.* 359, pp. 313–328 (1998). The work reported in these references is relevant to the bubble formation problem since, in unpressurized coating applicators, the free surface becomes cusp-like from the shear introduced by the fiber motion.

The phenomenon that has been overlooked in studies of air entrapment is tip streaming. It occurs when a fine filament of air is enjected from the free surface cusp and breaks into minute bubbles via Rayleigh instability. It has been reported that when an interface becomes pointed, small bubbles can be ejected from the cusp. Such an event occurs only when the viscosity ratio of the two fluids is less than 0.1, a criteria which is satisfied by air and most coating fluids.

Although the phenomenon that leads to bubble formation in many coating operations, such as optical fiber coating, has been recognized and at least partly understood, the practical approach to preventing bubble formation in manufacturing technology is still largely empirical. For example, to avoid excessive bubble formation in optical fiber coating, the practice in the industry is to increase the draw rate until excessive bubbles appear, then back off the draw rate until a satisfactory coating is obtained. This empirical process, aside from being technologically impure, results in unnecessary scrap, and increases the attendance required of the draw tower operator. It also implies an unpredictability and uncertainty in the draw and coating process. This means that empirical establishment of draw speed must be repeated when coating conditions change, i.e. the pressure or the coating material changes, or when the applicator design changes.

There has been, and continues to be, increasing emphasis on optical fiber draw speeds. Much effort has been expended on increasing fiber velocity in the coating process while avoiding the formation of bubbles in the coating layers. In U.S. Pat. No. 4,246,299 of Ohls, a fiber is passed through an applicator having a die body that defines a small, vertically oriented, longitudinally tapered passage having a reservoir disposed about it. A series of radial ports provide fluid communication between the reservoir and the passage. Turbulence within the coating material, which causes entrapment of air bubbles, is reduced by maintaining the level of coating material in the passage. In U.S. Pat. No. 4,374,161 of Geyling et al. there is shown a coating arrangement wherein the fluid coating material is directed radially toward the fiber. The passage diameter for the fiber is large enough to prevent contact with the fiber, while the pressure of the fluid coating material is high enough to substantially prevent air from entering the applicator. In U.S. Pat. No. 4,480,898 of Taylor, there is shown a dual coating applicator having a die that provides for formation of a gap between the die and the first coated layer. A second die is located at the exit of the first die, with the second coating material flowing through a narrow passage between the first and second dies. The second die also provides for a gap so that the second layer is applied at a free surface at the point of contact with the first layer. This arrangement has been found to reduce instabilities and coating non-uniformities at increased speeds.

Despite these efforts to develop fiber drawing processes at high draw speeds, bubble formation with these processes is still unpredictable and they require, in general, constant monitoring and empirical adjustment of draw speed. It would be a major advance in the art if a technically sound method was available to predict the onset of bubble formation and relate it to draw speed so that proper draw speed can be used in the initial stages of fiber draw, and can be calibrated with changes in coating conditions.

SUMMARY OF THE INVENTION

We have created an algorithm that relates coating conditions with draw speed in the context of bubble formation. It allows the draw tower operator to controllably and reliably set the speed for initial draw at the threshold of onset of excessive bubble formation. Each coating apparatus, e.g. each preploymer applicator design, has a different effect on bubble formation. We also found that the dependency of bubble formation behavior on coating process variables is relatively consistent from one applicator to another. Therefore the same general relationship can be applied to coating processes using any applicator, once that applicator is calibrated. The method of the invention is preferably applied to drawing optical fibers. However, it applies to drawing continuous filaments of any kind, including e.g. metal wires and textile polymers.

The basic principles of the invention, as well as the features thereof, may be aided by the following detailed description, read in conjunction with the drawing.

DETAILED DESCRIPTION OF THE INVENTION

The following description is directed to a method for coating of optical fibers at high draw speeds and wherein the coatings are of good quality, and bubble free. It is to be understood that the method of application is adaptable for use in coating filamentary materials other than the silica glass generally used in optical fibers.

Figure 1:
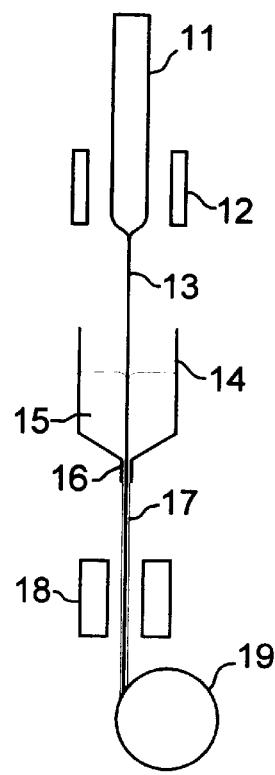
FIG. 1 is a schematic view of a fiber draw and coating apparatus.

In FIG. 1 there is shown a schematic representation of a fiber draw apparatus. Optical fiber preform 11 is shown with susceptor 12 representing the furnace (not shown) used to soften the glass preform and initiate fiber draw. The drawn fiber is shown at 13. The nascent fiber surface is then passed through coating cup 14 which contains the coating material prepolymer 15. The liquid coated fiber then exits from the cup 14 through exit die 16, which aids in maintaining the desired coating thickness. The prepolymer coated fiber 17 is then exposed to UV lamps 18, or whatever curing radiation is appropriate for the particular coating materials used, to cure the prepolymer and complete the coating process. The fiber with the coating cured is then taken up by take-up reel 19. The take-up reel controls the draw speed of the fiber. Draw speeds in the range typically of 1–50 m/sec. can be used. It is important that the fiber be centered within the coating cup and the exit die 16 to maintain concentricity of the fiber and coating. A commercial apparatus typically has pulleys that control the vertical alignment of the fiber. Hydrodynamic pressures in the die itself aid in centering the fiber. A stepper motor, controlled by a micro-step indexer, controls the take-up reel.

Coating materials for optical fibers are typically urethanes, acrylates, or urethane-acrylates, with a UV photoinitiator added. For a dual coated fiber, typical primary or inner coating materials are soft low modulus materials such as silicone, hot melt wax, or any of a number of polymer materials having a relatively low modulus. Typical materials for the second or outer coating are high modulus (3000–5000 cp) polymers, typically urethanes or acrylics. In practice both materials may be low and high modulus acrylic. The coating thickness typically ranges from 150–300 $\mu$m in diameter, with approximately 240 $\mu$m standard.

The coating cup 14 is shown open in this schematic, and an open (non-pressurized) cup is a useful option. However, in a typical commercial draw apparatus the cup is essentially closed, with a single opening or entrance die just large enough to allowing passage of the fiber into the cup. A pressure is maintained in the coating fluid. This pressure, e.g. 50–250 psi, aids in reducing bubble formation in the applied coating. Details of a typical coating cup and die are given in U.S. Pat. No. 4,374,161 of Geyling et al.

In analyzing the fluid dynamics of the coating process, four dimensionless parameters are of interest. They are the Reynolds number Re, the capillary number, Ca, the viscosity ratio, $\lambda$, and the pressure or stress scale, S. These parameters are defined as:

$$Re = \frac{\rho V l}{\mu}, \; Ca = \frac{\mu V}{\sigma}, \; \lambda = \frac{\mu'}{\mu}, \; S = \frac{p_l}{\mu V}$$

where $\rho$ is the coating density, V is the draw speed, l is a convenient length scale, e.g. the fiber diameter, $\mu$ is the coating viscosity and $\mu'$ is the viscosity of air, $\sigma$ is the interfacial surface tension, and p is the pressure.

Typical values for these parameters from actual fiber draw installations are given in Table I. The fiber diameter is used as the length scale. In Draw Line 1 the draw speed used was 14 meters/sec, and the coating container pressure was 100 psig. In Draw Line 2, draw speed varied from 0.2 to 3.5 m/s and the maximum pressure was about 50 psig.

TABLE I

|     | DRAW LINE 1 | DRAW LINE 2 |
| --- | --- | --- |
| Re  | ~0.10 | ~0.10 |
| Ca  | ~1000 | ~100 |
| $\lambda$ | ~$10^{-5}$ | ~$10^{-5}$ |
| S   | ~2 | ~1–20 |

The magnitude of Ca in both cases illustrates that surface tension effects are negligibly small. The significant group in Table 1 is the parameter S. Near the air-fiber-coating interface, S represents the ratio between the shear exerted on the fluid, which is being dragged downward by the fiber motion, and the supply pressure that is forcing the coating upward into the land of the entry die. Provided S>1, that is p>$\mu$V/l, the surface displacement is unlikely to lead to air entrapment in the applicator reservoir. However, if S<<1 there will be a significant distortion of the meniscus leading to bubble generation.

Based on experimental findings and production data the following relationship was developed to relate the relevant production variables:

$S = pl/\mu V$=constant  (Equation 1)

This relationship allows the fiber draw operator to predict the onset of excessive bubble formation from the draw parameters. A given draw apparatus, i.e. the coating container and entry die, is calibrated by observing the onset of bubble formation thereby setting the threshold value for S. Thereafter, for example, if the coating material is changed and the viscosity $\mu$ increases, then the pressure can be increased proportionally, or the velocity V decreased. In commercial production it is generally desirable to operate at the maximum draw speed. Therefore the usual parameter used for adjustment to avoid excessive bubble formation will be the pressure p. The relationship derived here allows the operator to select the proper pressure before the draw begins, thereby avoiding the empirical adjustments described earlier, with their attendant uncertainties and the scrapping of significant lengths of fiber.

The ramp up period for optical fiber draw operation is typically long, e.g. 15–30 minutes. During ramp up both the draw rate and the pressure in the applicator are adjusted, but the adjustment, as described earlier, is empirically based. Several kilometers of fiber are typically drawn during ramp up, and typically discarded. Using the technique of the invention, the draw rate adjustment from an initial value $V_i$ to the production draw rate $V_P$, and the pressure adjustment from an initial value $p_i$ to the production pressure $p_P$ can be coordinated to allow optimum ramp up conditions without incurring bubble formation. This allows fiber drawn and coated during ramp up to be reeled and used as commercial product.

Figure 2:
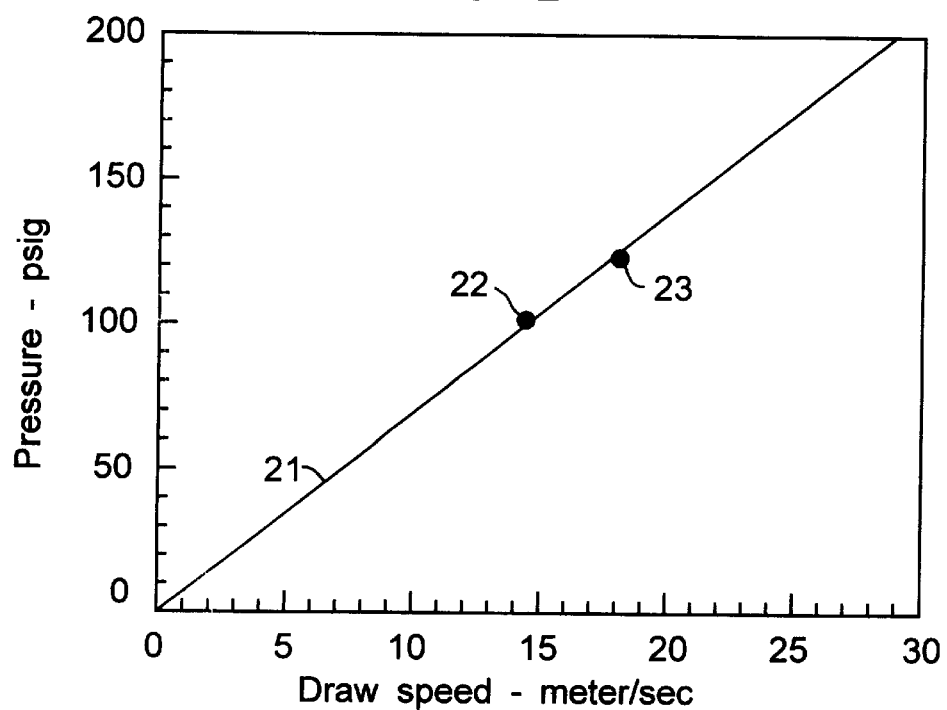
FIG. 2 is a plot of draw speed vs. pressure validating the algorithm of the invention.

The relationship of Equation 1 was verified by experimental results, some of which are given in FIG. 2. In FIG. 2, the draw speed (V) in meters/sec is plotted vs. pressure p in psig. The line 21 is essentially a plot of Equation 1. The points 22 and 23 were obtained with actual draw operations and show the correlation between the predicted p vs. V, and the actual case. The coating material used had a viscosity of 1933 cP (T=93° F.).

The principles of the present invention are applicable to coating containers and dies used for single coatings, for dual simultaneous coating, or tandem coating. Tandem coating has the advantage of allowing inspection after application and curing of the first coat before the second coat is applied. In the context of the invention this is equivalent to two separate coating operations and each can be controlled independent of the other (except for draw speed) using the control technique of the invention.

In the foregoing description the parameter l has been defined generically as a convenient length, and specifically the fiber diameter. The choice of the fiber diameter is convenient since it is an important parameter in the context of fiber production. Another length parameter can be chosen but that parameter will be equivalent to the fiber diameter, i.e. will be proportional to the fiber diameter, and although it will affect the absolute value of constant S it will not affect the proportionality of the other parameters.

In optical fiber drawing and coating as described above the coating material used is a prepolymer. However, as stated earlier the method of the invention applies to coating other kinds of continuous filaments and applies to coatings other than polymers. For example, the technique can be applied to drawing copper wire and coating the drawn copper wire with solder. The basic steps common to these processes are drawing a continuous filament, passing the drawn filament through a fluid coating material, and solidifying the fluid coating material.

In concluding the detailed description, it should be noted that it will be obvious to those skilled in the art that many variations and modifications may be made to the preferred embodiment without substantial departure from the principles of the present invention. All such variations, modifications and equivalents are intended to be included herein as being within the scope of the present invention, as set forth in the claims.

What is claimed is:

1. A filament coating process comprising:
    (a) passing the filament through a coating fluid container at a velocity V, said filament having a diameter l,
    (b) supplying coating fluid to the reservoir said coating fluid having a viscosity $\mu$,
    (c) applying pressure to the coating fluid at a pressure p, and
    (d) solidifying the coating,
the invention characterized in that at least one of the parameters selected from the group consisting of V, l, $\mu$, and p is established using the relationship:

$$S=pl/\mu V$$

where S is a constant.

2. The method of claim 1 wherein the fiber is an optical fiber.

3. An optical fiber coating process comprising:
    (a) passing the optical fiber through a coating container at a velocity V, said fiber having a diameter l,
    (b) supplying a prepolymer coating material to the container said prepolymer coating material having a viscosity $\mu$,
    (c) applying pressure to the prepolymer coating material at a pressure p,
    (d) adjusting at least one of the parameters selected from the group consisting of V, l, $\mu$, and p using the relationship:

$$S=pl/\mu V$$

where S is a constant, and
    (e) curing the prepolymer coating material.

4. The coating process of claim 3 wherein said constant S is determined by the steps of:
    (a) passing the optical fiber through a coating container at a velocity V, said fiber having a diameter l,
    (b) supplying a prepolymer coating material to the container said prepolymer coating material having a viscosity $\mu$,
    (c) applying pressure to the prepolymer coating material at a pressure p,
    (d) adjusting at least one of the parameters selected from the group consisting of V and p to create the onset of bubbles in said coating,
    (e) determining S using the relationship:

$$S=pl/\mu V.$$

5. An optical fiber coating process comprising:
    (a) passing the optical fiber through a coating container at a velocity starting at $V_i$ and ramping to a velocity $V_P$, said fiber having a diameter l,
    (b) supplying a prepolymer coating material to the container said prepolymer coating material having a viscosity $\mu$,
    (c) applying pressure to the prepolymer coating material starting at a pressure $p_i$ and ramping to a pressure $p_P$, (d) adjusting $V_i$, $p_i$, $V_P$ and $p_P$ using the relationship:

$$S = pl/\mu V$$

where S is a constant, and (e) curing the prepolymer coating material.

6. The method of claim 4 wherein the prepolymer coating material is cured using UV radiation.

* * * * *